(12) United States Patent
Tan et al.

(10) Patent No.: US 8,724,108 B2
(45) Date of Patent: May 13, 2014

(54) PHOTOELECTRIC AUTOCOLLIMATION METHOD AND APPARATUS BASED ON BEAM DRIFT COMPENSATION

(75) Inventors: Jiubin Tan, Heilongjiang (CN); Fan Zhu, Heilongjiang (CN); Jiwen Cui, Heilongjiang (CN)

(73) Assignee: Harbin Institute of Technology, Harbin (CN)

( * ) Notice: Subject to any disclaimer, the term of this patent is extended or adjusted under 35 U.S.C. 154(b) by 0 days.

(21) Appl. No.: 13/701,487

(22) PCT Filed: Jan. 18, 2012

(86) PCT No.: PCT/CN2012/070511
§ 371 (c)(1),
(2), (4) Date: Nov. 30, 2012

(87) PCT Pub. No.: WO2012/097730
PCT Pub. Date: Jul. 26, 2012

(65) Prior Publication Data
US 2013/0083323 A1    Apr. 4, 2013

(30) Foreign Application Priority Data

Jan. 19, 2011   (CN) .......................... 2011 1 0021726
Jan. 19, 2011   (CN) .......................... 2011 1 0021728
Jan. 19, 2011   (CN) .......................... 2011 1 0021730

(51) Int. Cl.
*G01J 4/00*   (2006.01)
(52) U.S. Cl.
USPC .......................................................... 356/364
(58) Field of Classification Search
USPC ................................................ 356/364–370
See application file for complete search history.

(56) References Cited

U.S. PATENT DOCUMENTS

2005/0052650 A1*   3/2005   Wu ................................ 356/364

FOREIGN PATENT DOCUMENTS

| CN | 1719192 A | 1/2006 |
| CN | 1719193 A | 1/2009 |
| CN | 102176086 A | 9/2011 |
| CN | 102176087 A | 9/2011 |
| CN | 102176088 A | 9/2011 |
| JP | 2002005617 A | 1/2002 |
| WO | 2006023523 A2 | 3/2006 |

OTHER PUBLICATIONS

International Search Report mailed Apr. 26, 2012 for priority application PCT/CN2012/070511.

* cited by examiner

*Primary Examiner* — Tara S Pajoohi Gomez
(74) *Attorney, Agent, or Firm* — Troutman Sanders LLP; Ryan A. Schneider; Benjamin C. Wiles

(57) ABSTRACT

Photoelectric autocollimation methods and apparatuses based on beam drift compensation are provided. The methods and apparatuses can be used to achieve a high autocollimation angle measurement accuracy. The apparatuses includes an autocollimator, a measurement mirror (12a), a beam drift monitoring and separating unit, a beam steering device (8), and a data processing controller (7). The beam drift monitoring and separating unit generate a reference beam with the same drift as the measurement beam. The measurement beam carries both angular deflection information of the measurement mirror and the angular beam drift information, while the reference beam carries only the angular beam drift information. The data processing controller gives out a signal to the beam steering device in real-time according to the magnitude of drift of the reference beam, to compensate the drift of the measurement beam.

14 Claims, 8 Drawing Sheets

| forming a collimated beam by passing a polarized beam emitted from a laser source through a reticle, a polarization-insensitive beamsplitter and a collimating lens successively; | S101 |

| reflecting the collimated beam by a beam steering device into a first polarizing beamsplitter, where it is splitted into a polarized transmitted beam and a polarized reflected beam having polarization states mutually perpendicular to each other; | S102 |

| forming a measurement beam by reflecting the polarized transmitted beam by a measurement mirror, which carries the two-dimensional angular deflection information of the measurement mirror and the angular beam drift information in the measurement process; transmitting the measurement beam through the first polarizing beamsplitter again and then returning the measurement beam reversely to the polarization-insensitive beamsplitter where the measurement beam is splitted into a transmitted measurement beam and a reflected measurement beam, wherein the reflected measurement beam is received by a first photoelectric position sensor after it transmits through a second polarizing beamsplitter; the output signal of the first photoelectric position sensor is then transferred to a data processing controller as a measurement signal; | S103 |

| forming a reference beam by reflecting the polarized reflected beam by a reference mirror, which carries only the angular beam drift information in the measurement process; reflecting the reference beam by the first polarizing beamsplitter again and returning the reference beam reversely to the polarization-insensitive beamsplitter on a common path with the measurement beam; splitting the reference beam into a reflected reference beam and a transmitted reference beam by the polarization-insensitive beamsplitter, wherein the reflected reference beam is received by a second photoelectric position sensor after it is reflected by the second polarizing beamsplitter; the output signal of the second photoelectric position sensor is transferred to the data processing controller as a reference signal; | S104 |

| providing a signal to the beam steering device in real-time according to the reference signal, which represents the magnitude of beam drift; deflecting the directions of measurement and reference beams simultaneously by the beam steering device to the opposite direction of beam drift, while calculating the angular deflection of the measurement mirror, which deflects with the object being measured. | S105 |

Fig.17 forming a collimated beam by passing a polarized beam emitted from a laser source through a reticle, a polarization-insensitive beamsplitter and a collimating lens successively;  — S901 reflecting the collimated beam by the beam steering device into the first polarizing beamsplitter; transmitting the collimated beam through the first polarizing beamsplitter to the beam splitting target, where it is splitted into a polarized transmitted beam and a polarized reflected beam, remaining the polarization states of the two beams unchanged;  — S902 using the polarized reflected beam as a measurement beam, which carries the two-dimensional angular deflection information of the beam splitting target and the angular beam drift information in the measurement process; transmitting the measurement beam through the first polarizing beamsplitter again and then returning the measurement beam reversely to the polarization-insensitive beamsplitte, where the measurement beam is splitted into a transmitted measurement beam and a reflected measurement beam, wherein the reflected measurement beam is received by a first photoelectric position sensor after it transmits through a second polarizing beamsplitter; the output signal of the first photoelectric position sensor is then transferred to a data processing controller as a measurement signal;  — S903 forming a reference beam by reflecting the polarized transmitted beam by the beam splitting target, which carries only the angular beam drift information in the measurement process; reflecting the reference beam to the first polarizing beamsplitter by a mirror, after transmitting it through a 1/2 wave plate; reflecting the reference beam by the first polarizing beamsplitter again and returning the reference beam reversely to the polarization-insensitive beamsplitter on a common path with the measurement beam; splitting the reference beam into a reflected reference beam and a transmitted reference beam by the polarization-insensitive beamsplitter, wherein the reflected reference beam is received by a second photoelectric position sensor after it is reflected by the second polarizing beamsplitter; the output signal of the second photoelectric position sensor is transferred to the data processing controller as a reference signal;  — S904 providing a signal to the beam steering device in real-time according to the reference signal, which represents the magnitude of beam drift; deflecting the directions of measurement and reference beams simultaneously by the beam steering device to the opposite direction of beam drift, while calculating the angular deflection of the beam splitting target, which deflects with the object being measured.  — S905

Fig.19

PHOTOELECTRIC AUTOCOLLIMATION METHOD AND APPARATUS BASED ON BEAM DRIFT COMPENSATION

CROSS-REFERENCE TO RELATED APPLICATIONS

This application is a US National Stage of International Application No. PCT/CN2012/070511, filed 18 Jan. 2012, which claims the benefit of CN201110021726.X, filed 19 Jan. 2011, CN201110021728.9, filed 19 Jan. 2011, and CN201110021730.6, filed 19 Jan. 2011, each herein fully incorporated by reference.

TECHNICAL FIELD OF THE INVENTION

This invention relates to a photoelectric autocollimation method and apparatus which can be used to achieve high autocollimation angle measurement accuracy.

BACKGROUND ARTS

Photoelectric autocollimator is widely used for measurement and calibration of small angles, flatness measurement of plates, sway angle measurement of axises, straightness measurement of slides, and position uncertainty measurement of rotary tables, etc. in the fields of mechanical manufacturing, shipbuilding, aerospace, and Scientific Research, etc.

Laser is often used for long-distance and high-precision measurement of angles because of its monochromaticity and high energy density. Many high-precision photoelectric autocollimators have been developed with laser used as light source. But their measurement uncertainty is mainly limited by the drift of laser beam, which increases as the measurement distance increases.

The uncertainty of most photoelectric autocollimators is now above 0.5 arcsecond, and their measurement distance is usually less than 6 m. The drift of laser beam mainly comes from: (1) unstable light intensity and direction of light emitting; (2) atmospheric disturbance and random jittering during beam propagation; (3) light bending due to atmospheric refractive.

Restraining or compensating beam drift is the key to the improvement of measurement accuracy. The followings are some methods which can be used to restrain or compensate beam drift:

(1) Spatial connection lines of diffraction or interference fringes generated by zone plates, phase plates, binary optic elements or double slits, can be used to restrain beam drift. For example, a zone plate can be used to generate a bright cross reticle on the line connecting laser light source and zone plate center. The cross reticle can be imaged at different positions along the optical axis, by adjusting a telescope between laser light source and zone plate. So the optical axis can be used as a datum line and can be traced by the cross reticle. Because the reticle is generated by diffraction and interference, it has a good anti-interference performance and it can therefore reach a measurement accuracy of +/−1×10$^{-7}$ rad (0.04 arcsecond). However, this method requires constant adjustment of the telescope to move the reticle along the optical-axis, and so, it cannot be used to achieve real-time compensation. For this reason, the application of this method is limited.

Richard F. et al. proposed a Poisson line method. A plane wave is used to illuminate an opaque sphere to generate a Poisson line perpendicular to the incident plane wave, and the line reverse extension cord passes through the sphere center. The line can thus be used as a datum line with the capability of rejection to interference. But the directional change of incident plane wave causes the directional change of Poisson line, which has a direct influence on the accuracy of measurement.

Hao Q. et al. proposed a collimation method which uses the central dark line generated by the diffraction of a phase plate as the datum line. If the incident light is a plane wave in a given direction, the position of dark line remains unchanged when the incident plane wave has a linear drift. In this way, the method restrains the beam drift and achieves a measurement accuracy of 10$^{-6}$ rad (0.2 arcsecond). However, this method cannot be used to restrain the angular drift of incident light.

(2) Methods of dual beams compensation

Xingzhan Liu, et al. from Tsinghua University proposed a symmetrical dual beams compensation method. In this method, a special light path is used to split the incident beam into two symmetrical beams. The linear or angular drift of incident beam causes directional changes of the two symmetrical beams, while the direction of symmetrical center of the two beams remains unchanged. This method can be used to achieve a measurement accuracy of 1.8×10$^{-6}$ rad (0.37 arcsecond). However, the generation of symmetrical dual beams needs multiple reflections and refractions, which increase the difficulties of processing and installing optic components. In addition, the two symmetrical beams have different drifts due to the noncoincidence of two beam paths, which restrains the effect of compensation for the drift caused on the beam path.

Cuifang Kuang from Beijing Jiaotong University proposed a common path compensation system. The emergent laser beam is parallelly reflected back by a cube-corner and divided into two beams by a prism. One of the beams is used as the measurement signal and the other is used as the compensating signal to compensate the position error resulting from air disturbance. The angular drift caused by air disturbance can be compensated using this method in real time. But this method is mainly appropriate for measurement of straightness, and it is difficult to use it for measurement of angles, because of the parallel and reversely reflective properties of a cube-corner reflector.

Fengling You from Beijing Jiaotong University proposed an angle measurement method based on common-path compensation for beam drift. In this method a semi-reflective mirror and a cube-corner reflector are used as moving parts which move along the slide to be measured. The semi-reflective mirror divides the incident beam into a reflected beam and a transmitted beam. The reflected beam is used as the measurement beam, and the transmitted beam is reflected back by the cube-corner reflector and used as the compensation beam to gain the angular drift in the measuring process for real-time compensation to improve the measurement accuracy. In this method the measurement beam and the compensation beam are not on a common path during returning. The drift of compensation beam can not completely represent the drift of measurement beam, which leads to a poor compensation effect.

(3) Method of close-loop feedback control

Close-loop feedback control can be used to enhance the directional stability of laser beam. This method provides an effective technical approach to eliminate or compensate the angle measurement error resulting from beam drift to achieve a high angle measurement accuracy.

Dianhong Yu, et al. from Xi'an University of Technology adopted the method of close-loop feedback control to restrain beam drift. The feedback system receives the beam drift signal and drives the actuating mechanism to adjust the two-dimensional direction of laser beam. This method can be used to achieve a real-time correction for beam drift and an accuracy of $5\times10^{-7}$ rad (0.1 arcsecond). But this method is used to enhance the directional stability of laser beam only, and it cannot be used for measurement of angles.

Jiubin Tan, et al. proposed in 2004 a laser beam alignment system based on fast feedback control. The system can be used to dynamically detect and control the linear and angular drifts of laser beam in real-time and achieve an alignment accuracy of $0.6\times10^{-7}$ rad (0.01 arcsecond) in a given direction. However, this system can only used for alignment of laser beam in a given direction. It can not be used for measurement of angles.

Jiubin Tan, et al. proposed in 2005 a photoelectric autocollimation method and apparatus (Patent application key: ZL200510089852.3). A special beam splitting target is used in this method to feedback a reference beam with the same characteristics of drift as the measurement beam during measurement of angles. The drift of measurement beam is restrained by controlling the beam steering device using the beam drift signal taken from the reference beam. This method can be used to enhance the stability of a photoelectric autocollimator over a large distance. However, the measurement and reference beams used in this method are not on a common path during returning. The two beams return from different paths, and so, the drift of reference beam cannot completely represent the drift of measurement beam. The difference of the drifts of the two beams increases while the measurement distance increases. The feedback control system cannot effectively restrain the drift of measurement beam, and so, the final angle measurement accuracy is restrained.

In conclusion, the existing methods and apparatuses described above have the following deficiencies:

(1) The method of using spatial connection lines of diffraction or interference fringes requires high directional stability of the incident beam, and it cannot restrain the angular drift of the incident beam. The angular drift of incident beam results to the drift of the spatial connection lines which is used as the datum line. Moreover, this method has a limited capability of restraining the air disturbance in the beam path.

(2) The generation of the symmetrical dual beams in the methods of dual beams compensation is difficult. And the measurement and reference beams used in this method are not on a common path, and so, the drift of reference beam cannot completely represent the drift of measurement beam, which results to poor compensation effect.

(3) The close-loop feedback control method is mainly used to enhance the stability of laser beam in a given direction, and it is difficult to be used for measurement of angles. Moreover, the reference and measurement beams cannot transmit on a common path, and so the drift of reference beam is not completely the same as the drift of measurement beam, which results to poor compensation effect.

SUMMARY OF THE INVENTION

One purpose of this invention is to provide a photoelectric autocollimation method and apparatus based on beam drift compensation, which can be used to achieve high autocollimation angle measurement accuracy.

In order to attain the purpose mentioned above, three aspects are proposed in this invention.

One aspect of this invention relates to a photoelectric autocollimation method based on beam drift compensation, which employs a reference mirror to reflect the reference beam, comprises the steps of: forming a collimated beam by passing a polarized beam emitted from a laser source through a reticle, a polarization-insensitive beamsplitter and a collimating lens successively; reflecting the collimated beam by a beam steering device into a first polarizing beamsplitter, where it is splitted into a polarized transmitted beam and a polarized reflected beam having polarization states mutually perpendicular to each other; forming a measurement beam by reflecting the polarized transmitted beam by a measurement mirror, which carries the two-dimensional angular deflection information of the measurement mirror and the angular beam drift information in the measurement process; transmitting the measurement beam through the first polarizing beamsplitter again and then returning the measurement beam reversely to the polarization-insensitive beamsplitter where the measurement beam is splitted into a transmitted measurement beam and a reflected measurement beam, wherein the reflected measurement beam is received by a first photoelectric position sensor after it transmits through a second polarizing beamsplitter; the output signal of the first photoelectric position sensor is then transferred to a data processing controller as a measurement signal; forming a reference beam by reflecting the polarized reflected beam by a reference mirror, which carries only the angular beam drift information in the measurement process; reflecting the reference beam by the first polarizing beamsplitter again and returning the reference beam reversely to the polarization-insensitive beamsplitter on a common path with the measurement beam; splitting the reference beam into a reflected reference beam and a transmitted reference beam by the polarization-insensitive beamsplitter, wherein the reflected reference beam is received by a second photoelectric position sensor after it is reflected by the second polarizing beamsplitter; the output signal of the second photoelectric position sensor is transferred to the data processing controller as a reference signal; providing a signal to the beam steering device in real-time according to the reference signal, which represents the magnitude of beam drift; and deflecting the directions of measurement and reference beams simultaneously by the beam steering device to the opposite direction of beam drift, while calculating the angular deflection of the measurement mirror, which deflects with the object being measured.

The magnitude of beam drift in this method can be calculated by:

$$\varepsilon = \arctan\left(\frac{\Delta d_{ref}}{f}\right),$$

where $\Delta d_{ref}$ is the position of the spot formed by the reference beam on the second photoelectric position sensor with respect to the null position during every sampling period, and f is the focal length of the collimating lens.

The spatial angular deflections of measurement and reference beams adjusted by the beam steering device in this method, is calculated using $\phi=\varepsilon$.

The angular deflection of the measurement mirror in this method, which deflects with the object being measured, is calculated by:

$$\theta = \frac{1}{2}\arctan\left(\frac{\Delta d_m}{f}\right),$$

where $\Delta d_m$ is the position of the spot formed by the measurement beam on the first photoelectric position sensor with respect to the null position during every sampling period.

In this aspect, a photoelectric autocollimation apparatus is provided, which comprises an autocollimator, a beam steering device, a measurement mirror, a data processing controller and a beam drift monitoring and separating unit based on the reference mirror: the autocollimator mainly comprising a laser source, a reticle, a polarization-insensitive beamsplitter, a collimating lens and a first photoelectric position sensor which is positioned on the focal plane of the collimating lens in the reflection direction of polarization-insensitive beamsplitter. The output signal of first photoelectric position sensor is transferred to the data processing controller, which calculates the angular deflection of the measurement mirror according to this output signal; the beam steering device is positioned right in front of the collimating lens, which comprising a beam steering actuator and a driving mechanism; it is also connected to the data processing controller, to control the deflection of beam steering device; the measurement mirror is positioned on the object being measured, and it deflects with the object being measured; wherein, the beam drift monitoring and separating unit based on the reference mirror comprising a first polarizing beamsplitter, a reference mirror, a second polarizing beam splitter and a second photoelectric position sensor. The first polarizing beamsplitter is positioned between the beam steering device and the measurement mirror, and it is close to the measurement mirror with its transmission direction opposite to the measurement mirror. The reference mirror is positioned opposite to the reflection direction of the first polarizing beamsplitter, and it is fastened steadily in the measurement process. The second polarizing beam splitter is positioned in the reflection direction of the polarization-insensitive beamsplitter, and between the polarization-insensitive beamsplitter and the focal plane of the collimating lens. The second photoelectric position sensor is positioned on the focal plane of the collimating lens in the reflection direction of the second polarizing beam splitter. The output signal of the second photoelectric position sensor is transferred to the data processing controller, which calculates the magnitude of beam drift according to this output signal. In this apparatus the laser beam emitted from the laser source can be a circular polarized beam, an elliptical polarized beam, a perpendicular polarized beam, or a linear polarized beam with the polarization plane uncoincident with the transmitted or reflected polarization plane of the first polarizing beamsplitter.

Alternatively, in another possible embodiment, the first polarizing beamsplitter can be replaced by a second polarization-insensitive beamsplitter, and in the meantime, the beam drift monitoring and separating unit of this apparatus further comprises a first ¼ wave plate, which is positioned between the second polarization-insensitive beamsplitter and the reference mirror, others remain unchanged. The laser beam emitted from the laser source is a linear polarized beam with the polarization plane coincident with the transmitted polarization plane of the second polarizing beam splitter.

Additionally, the beam drift monitoring and separating unit of this apparatus can further comprises a second ¼ wave plate, which is positioned between the second polarizing beamsplitter and the polarization-insensitive beamsplitter. The fast axis of the second ¼ wave plate is coincident with the transmitted polarization plane of the second polarizing beamsplitter. In this apparatus the laser beam emitted from the laser source can be a circular polarized beam or an elliptical polarized beam.

The advantages of the autocollimation method and apparatus in this aspect are as follows:

1. The reference and measurement beams used in this method and apparatus root in one laser source and are transmitted on a common path, which ensures that the drifts of the reference and measurement beams are exactly the same. In addition, the polarization states of the reference and measurement beams are different, which ensures that the reference and measurement beams can be easily separated and detected at the receiving end after they are transmitted on a common path. These two points lay the foundation for effective beam drift compensation. This is one of the main advantages, compared with existing photoelectric autocollimation measurement techniques.

2. The reference mirror is fastened steadily in the measurement process, while the measurement mirror deflects with the object being measured. The reference beam which is reflected by the steadily fastened reference mirror carries only the beam drift information in the measurement process. So the drift of reference beam can be an exact reference to that of measurement beam. This is another one of the main advantages, compared with existing photoelectric autocollimation measurement techniques.

3. Close-loop feedback control is adopted to restrain the drift of measurement beam in this method and apparatus. The data processing controller gives out a signal to the beam steering device in real-time according to the magnitude of drift of reference beam. The directions of measurement and reference beams are simultaneously deflected by the beam steering device to the opposite direction of beam drift. The drift of measurement beam is then restrained, and the measurement beam can be used for measurement of angles to achieve a high angle measurement accuracy. This is a third one of the main advantages, compared with existing photoelectric autocollimation measurement techniques.

Another aspect of this invention relates to a photoelectric autocollimation method based on beam drift compensation, which employs a corner reflector to reflect the reference beam, comprises the steps of: forming a collimated beam by passing a polarized beam emitted from a laser source through a reticle, a polarization-insensitive beamsplitter and a collimating lens successively; reflecting the collimated beam by a beam steering device, into a first polarizing beamsplitter, where it is splitted into a polarized transmitted beam and a polarized reflected beam having polarization states mutually perpendicular to each other; forming a measurement beam by reflecting the polarized transmitted beam by a measurement mirror, which carries the two-dimensional angular deflection information of the measurement mirror and the angular beam drift information in the measurement process; transmitting the measurement beam through the first polarizing beamsplitter again and then returning the measurement beam reversely to the polarization-insensitive beamsplitter where the measurement beam is splitted into a transmitted measurement beam and a reflected measurement beam, wherein the reflected measurement beam is received by a first photoelectric position sensor after it transmits through a second polarizing beamsplitter; the output signal of the first photoelectric position sensor is then transferred to a data processing controller as a measurement signal; forming a reference beam by reflecting the polarized reflected beam by a corner reflector, which carries only the angular beam drift information in the measurement process; reflecting the reference beam by the first polarizing beamsplitter again and returning the reference beam reversely to the polarization-insensitive beamsplitter on a common path with the measurement beam; splitting the reference beam into a reflected reference beam and a transmitted reference beam by the polarization-insensitive beamsplitter, wherein the reflected reference beam is received by a second photoelectric position sensor after it is reflected by the second polarizing beamsplitter; the output signal of the second photoelectric position sensor is transferred to the data processing controller as a reference signal; providing a signal to the beam steering device in real-time according to the reference signal, which represents the magnitude of beam drift; and deflecting the directions of measurement and reference beams simultaneously by the beam steering device to the opposite direction of beam drift, while calculating the angular deflection of the measurement mirror, which deflects with the object being measured.

The magnitude of beam drift in this method can be calculated by:

$$\varepsilon = \arctan\left(\frac{\Delta d_{ref}}{f}\right),$$

where $\Delta d_{ref}$ is the position of the spot formed by the reference beam on the second photoelectric position sensor with respect to the null position during every sampling period, and f is the focal length of the collimating lens.

The spatial angular deflections of measurement and reference beams adjusted by the beam steering device in this method, is calculated using $\phi = \varepsilon$.

The angular deflection of the measurement mirror in this method, which deflects with the object being measured, is calculated by:

$$\theta = \frac{1}{2}\arctan\left(\frac{\Delta d_m}{f}\right),$$

where $\Delta d_m$ is the position of the spot formed by the measurement beam on the first photoelectric position sensor with respect to the null position during every sampling period.

In this aspect, a photoelectric autocollimation apparatus is provided which comprises an autocollimator, a beam steering device, a measurement mirror, a data processing controller and a beam drift monitoring and separating unit based on the corner reflector; the autocollimator mainly comprising a laser source, a reticle, a polarization-insensitive beamsplitter, a collimating lens and a first photoelectric position sensor which is positioned on the focal plane of the collimating lens in the reflection direction of the polarization-insensitive beamsplitter. The output signal of the first photoelectric position sensor is transferred to the data processing controller, which calculates the angular deflection of the measurement mirror according to this output signal; the beam steering device is positioned right in front of the collimating lens, which comprising a beam steering actuator and a driving mechanism. It is also connected to the data processing controller, which controls the deflection of the beam steering device; the measurement mirror is positioned on the object being measured, and it deflects with the object being measured; wherein, the beam drift monitoring and separating unit based on the corner reflector comprising a first polarizing beamsplitter, a corner reflector, a second polarizing beam splitter and a second photoelectric position sensor. The first polarizing beamsplitter is positioned between the beam steering device and the measurement mirror, and it is close to the measurement mirror, with its transmission direction opposite to the measurement mirror. The corner reflector is positioned opposite to the reflection direction of the first polarizing beamsplitter. The first polarizing beamsplitter, the corner reflector and the measurement mirror are fastened into an assembly, which deflects with the object being measured. The second polarizing beam splitter is positioned in the reflection direction of the polarization-insensitive beamsplitter, and between the polarization-insensitive beamsplitter and the focal plane of the collimating lens. The second photoelectric position sensor is positioned on the focal plane of the collimating lens in the reflection direction of the second polarizing beam splitter. The output signal of the second photoelectric position sensor is transferred to the data processing controller, which calculates the magnitude of beam drift according to this output signal. In this apparatus the laser beam emitted from the laser source can be a circular polarized beam, an elliptical polarized beam, a perpendicular polarized beam, or a linear polarized beam with the polarization plane uncoincident with the transmitted or reflected polarization plane of the first polarizing beamsplitter.

Alternatively, in another possible embodiment, the first polarizing beamsplitter can be replaced by a second polarization-insensitive beamsplitter; with the beam drift monitoring and separating unit of this apparatus further comprises a first ¼ wave plate, which is positioned between the second polarization-insensitive beamsplitter and the reference mirror, others unchanged; the laser beam emitted from the laser source is a linear polarized beam with the polarization plane coincident with the transmitted polarization plane of the second polarizing beam splitter.

Additionally, the beam drift monitoring and separating unit of this apparatus can further comprises a second ¼ wave plate, which is positioned between the second polarizing beamsplitter and the polarization-insensitive beamsplitter; the fast axis of the second ¼ wave plate is coincident with the transmitted polarization plane of the second polarizing beamsplitter; in this apparatus the laser beam emitted from the laser source can be a circular polarized beam or an elliptical polarized beam.

The corner reflector of the beam drift monitoring and separating unit of this apparatus can be a cube-corner reflector, or a right-angle conical corner reflector.

The advantages of the autocollimation method and apparatus in this aspect are as follows:

1. The reference and measurement beams used in this method and apparatus root in one laser source and are transmitted on a common path, which ensures that the drifts of the reference and measurement beams are exactly the same. In addition, the polarization states of the reference and measurement beams are different, which ensures that the reference and measurement beams can be easily separated and detected at the receiving end after they are transmitted on a common path. These two points lay the foundation for effective beam drift compensation. This is one of the main advantages, compared with existing photoelectric autocollimation measurement techniques.

2. A corner reflector is used to reflect the reference beam in this method and apparatus. The direction of beam reflected by the corner reflector is exactly the reversal direction of the incident beam, and it is insensitive to the deflection of the corner reflector. So the first polarizing beamsplitter, the corner reflector and the measurement mirror in this method and apparatus can be fastened into an assembly, which deflects with the object being measured. The assembly has a good anti-interference performance, and it is convenient to be used in measurement of angle. This is another one of the main advantages, compared with existing photoelectric autocollimation measurement techniques.

3. Close-loop feedback control is adopted to restrain the drift of measurement beam in this method and apparatus. The data processing controller gives out a signal to the beam steering device in real-time according to the magnitude of drift of the reference beam. The directions of measurement and reference beams are simultaneously deflected by the beam steering device to the opposite direction of beam drift. The drift of measurement beam is then restrained, and the measurement beam can be used for measurement of angles to achieve a high angle measurement accuracy. This is a third one of the main advantages, compared with existing photoelectric autocollimation measurement techniques.

A third aspect of this invention relates to a photoelectric autocollimation method based on beam drift compensation, which employs a beam splitting target to reflect the reference beam, comprises the steps of: forming a collimated beam by passing a polarized beam emitted from a laser source through a reticle, a polarization-insensitive beamsplitter and a collimating lens successively; reflecting the collimated beam by the beam steering device into the first polarizing beamsplitter; transmitting the collimated beam through the first polarizing beamsplitter to the beam splitting target, where it is splitted into a polarized transmitted beam and a polarized reflected beam, remaining the polarization states of the two beams unchanged; using the polarized reflected beam as a measurement beam, which carries the two-dimensional angular deflection information of the beam splitting target and the angular beam drift information in the measurement process; transmitting the measurement beam through the first polarizing beamsplitter again and then returning the measurement beam reversely to the polarization-insensitive beamsplitter, where the measurement beam is splitted into a transmitted measurement beam and a reflected measurement beam, wherein the reflected measurement beam is received by a first photoelectric position sensor after it transmits through a second polarizing beamsplitter; the output signal of the first photoelectric position sensor is then transferred to a data processing controller as a measurement signal; forming a reference beam by reflecting the polarized transmitted beam by the beam splitting target, which carries only the angular beam drift information in the measurement process; reflecting the reference beam to the first polarizing beamsplitter by a mirror, after transmitting it through a ½ wave plate; reflecting the reference beam by the first polarizing beamsplitter again and returning the reference beam reversely to the polarization-insensitive beamsplitter on a common path with the measurement beam; splitting the reference beam into a reflected reference beam and a transmitted reference beam by the polarization-insensitive beamsplitter, wherein the reflected reference beam is received by a second photoelectric position sensor after it is reflected by the second polarizing beamsplitter; the output signal of the second photoelectric position sensor is transferred to the data processing controller as a reference signal; providing a signal to the beam steering device in real-time according to the reference signal, which represents the magnitude of beam drift; deflecting the directions of the measurement and reference beams simultaneously by the beam steering device to the opposite direction of beam drift, while calculating the angular deflection of the beam splitting target, which deflects with the object being measured.

The magnitude of beam drift in this method can be calculated by:

$$\varepsilon = \arctan\left(\frac{\Delta d_{ref}}{f}\right),$$

where $\Delta d_{ref}$ is the position of the spot formed by the reference beam on the second photoelectric position sensor with respect to the null position during every sampling period, and f is the focal length of the collimating lens.

The spatial angular deflections of measurement and reference beams adjusted by the beam steering device in this method, is calculated using $\phi = \varepsilon$.

The angular deflection of the measurement mirror in this method, which deflects with the object being measured, is calculated by:

$$\theta = \frac{1}{2}\arctan\left(\frac{\Delta d_m}{f}\right),$$

where $\Delta d_m$ is the position of the spot formed by the measurement beam on the first photoelectric position sensor with respect to the null position during every sampling period.

In this aspect, a photoelectric autocollimation apparatus for implementing the method, which comprises an autocollimator, a beam steering device, a beam splitting target, a data processing controller and a beam drift monitoring and separating unit based on the beam splitting target: the autocollimator mainly comprising a laser source, a reticle, a polarization-insensitive beamsplitter, a collimating lens and a first photoelectric position sensor which is positioned on the focal plane of the collimating lens in the reflection direction of the polarization-insensitive beamsplitter. The output signal of the first photoelectric position sensor is transferred to the data processing controller, which calculates the angular deflection of the beam splitting target according to this output signal; the beam steering device is positioned right in front of the collimating lens, which consists of a beam steering actuator and a driving mechanism. It is also connected to the data processing controller to control the deflection of the beam steering device; the beam splitting target is positioned on the object being measured, and it deflects with the object being measured; wherein, the beam drift monitoring and separating unit based on the beam splitting target comprising a first polarizing beamsplitter, a mirror, a ½ wave plate, a beam splitting target, a second polarizing beamsplitter and a second photoelectric position sensor. The beam splitting target is a prism with half of its slope coated with semi-reflective coating film and the other half uncoated. The beam splitting target is positioned on the object being measured, and it deflects with the object being measured. The first polarizing beamsplitter is positioned between the beam steering device and the beam splitting target, and it is close to the beam splitting target, with its transmission direction aiming at the coated half slope of the beam splitting target. The mirror is positioned 45° with respect to the uncoated half slope of the beam splitting target, and 45° with respect to the reflection direction of the first polarizing beamsplitter. The ½ wave plate is positioned between the uncoated half slope of the beam splitting target and the mirror. The first polarizing beamsplitter, the mirror, the ½ wave plate and the beam splitting target are fastened into an assembly, which deflects with the object being measured. The second polarizing beamsplitter is positioned in the reflection direction of the polarization-insensitive beamsplitter, between the polarization-insensitive beamsplitter and the focal plane of the collimating lens. The second photoelectric position sensor is positioned on the focal plane of the collimating lens in the reflection direction of the second polarizing beam splitter. The output signal of the second photoelectric position sensor is transferred to the data processing controller, which calculates the magnitude of beam drift according to this output signal.

In this apparatus, the laser beam emitted from the laser source is a linear polarized beam with the polarization plane coincident with the transmitted polarization plane of the first polarizing beam splitter.

The mirror of the beam drift monitoring and separating unit in this apparatus can be a plane mirror, a total reflection prism, or a polarizing beamsplitter with the reflected polarization plane coincident with the first polarizing beamsplitter.

The advantages of the autocollimation method and apparatus in this aspect are as follows:

1. The reference and measurement beams used in this method and apparatus root in one laser source and are transmitted on a common path, which ensures that the drifts of the reference and measurement beams are exactly the same. In addition, the polarization states of the reference and measurement beams are different, which ensures that the reference and measurement beams can be easily separated and detected at the receiving end after they are transmitted on a common path. These two points lay the foundation for effective beam drift compensation. This is one of the main advantages, compared with existing photoelectric autocollimation measurement techniques.

2. A beam splitting target is used to reflect the reference beam in this method and apparatus. The beam splitting target splits the incident beam into two beams, which are used as the measurement and reference beams. The direction of reference beam reflected by the beam splitting target is exactly the reversal direction of the incident beam, and it is insensitive to the deflection of the beam splitting target. So the first polarizing beamsplitter, the beam splitting target, the ½ wave plate and the mirror in this method and apparatus can be fastened into an assembly, which deflects with the object being measured. The assembly has a good anti-interference performance, and it is convenient to be used in measurement of angle. This is another one of the main advantages, compared with existing photoelectric autocollimation measurement techniques.

3. Close-loop feedback control is adopted to restrain the drift of measurement beam in this method and apparatus. The data processing controller gives out a signal to the beam steering device in real-time according to the magnitude of drift of reference beam. The directions of measurement and reference beams are simultaneously deflected by the beam steering device to the opposite direction of beam drift. The drift of measurement beam is then restrained, and the measurement beam can be used for measurement of angles to achieve a high angle measurement accuracy. This is a third one of the main advantages, compared with existing photoelectric autocollimation measurement techniques.

BRIEF DESCRIPTION OF THE DRAWINGS

Wherein

FIG. 17: flow diagram of the photoelectric autocollimation method based on beam drift compensation, which employs a reference mirror to reflect the reference beam;

FIG. 19: flow diagram of the photoelectric autocollimation method based on beam drift compensation, which employs a beam splitting target to reflect the reference beam;

PREFERRED EMBODIMENTS OF THE INVENTION

Preferred Embodiment 1

Figure 1:
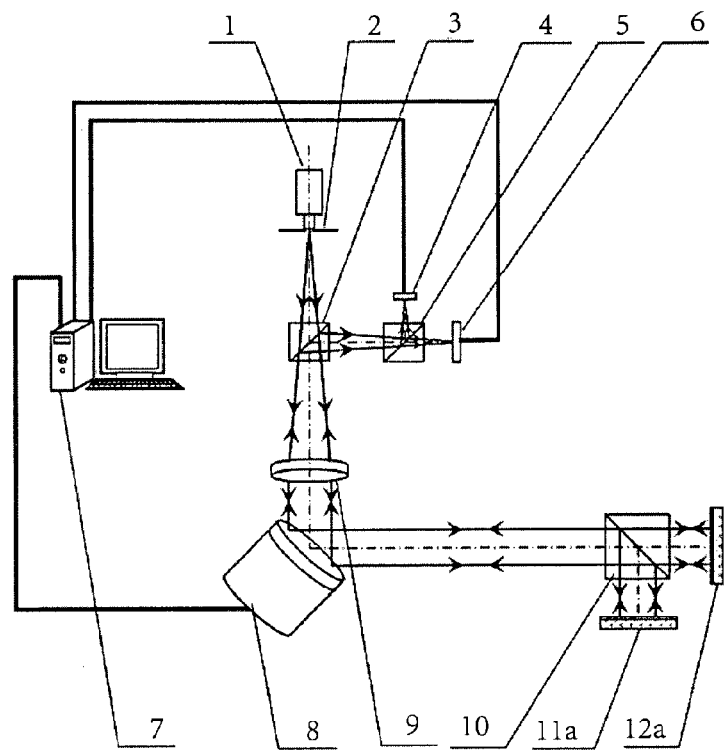
FIG. 1: construction of the photoelectric autocollimation apparatus proposed in preferred embodiment 1.

As shown in FIG. 17, the proposed photoelectric autocollimation method based on beam drift compensation, which employs a reference mirror to reflect the reference beam, comprises following steps:

S101: A collimated beam is formed by passing a polarized beam emitted from a laser source through a reticle, a polarization-insensitive beamsplitter and a collimating lens successively;

S102: The collimated beam is reflected by a beam steering device into a first polarizing beamsplitter, which split it into a polarized transmitted beam and a polarized reflected beam, so that both the transmitted and reflected beams are polarized with the polarization states mutually perpendicular to each other;

S103: The polarized transmitted beam obtained in S102 is reflected by a measurement mirror, and then formulated as a measurement beam. The described measurement beam carries the two-dimensional angular deflection information of the measurement mirror and the angular beam drift information in the measurement process. The described measurement beam transmits through the first polarizing beamsplitter again and returns reversely to the polarization-insensitive beamsplitter. The measurement beam is then splitted into two beams (i.e. transmitted and reflected measurement beams) by the polarization-insensitive beamsplitter, and its reflected beam is received by a first photoelectric position sensor after it transmits through a second polarizing beamsplitter. The output signal of the first photoelectric position sensor is transferred to the data processing controller as a measurement signal;

S104: The polarized reflected beam obtained in S102 is reflected by the reference mirror, and is then formulated as a reference beam. The described reference beam carries only the angular beam drift information in the measurement process. The described reference beam is reflected by the first polarizing beamsplitter again and returns reversely to the polarization-insensitive beamsplitter on a common path with the measurement beam. The reference beam is then splitted into two beams (i.e. transmitted and reflected reference beams) by the polarization-insensitive beamsplitter, and its reflected beam is received by a second photoelectric position sensor after it is reflected by the second polarizing beamsplitter. The output signal of the second photoelectric position sensor is transferred to the data processing controller as a reference signal;

S105: The data processing controller gives out a signal to the beam steering device in real-time according to the reference signal, which represents the magnitude of beam drift. The directions of measurement and reference beams are simultaneously deflected by the beam steering device to the opposite direction of beam drift, while the data processing controller calculates the angular deflection of the measurement mirror, which deflects with the object being measured.

The magnitude of beam drift in this method is calculated by:

$$\varepsilon = \arctan\left(\frac{\Delta d_{ref}}{f}\right),$$

where $\Delta d_{ref}$ is the position of the spot formed by the reference beam on the second photoelectric position sensor with respect to the null position during every sampling period, and f is the focal length of the collimating lens.

The spatial angular deflections of measurement and reference beams adjusted by the beam steering device in this method, is calculated using $\phi=\varepsilon$.

The angular deflection of the measurement mirror in this method, which deflects with the object being measured, is calculated by:

$$\theta = \frac{1}{2}\arctan\left(\frac{\Delta d_m}{f}\right),$$

where $\Delta d_m$ is the position of the spot formed by the measurement beam on the first photoelectric position sensor with respect to the null position during every sampling period.

Preferred Embodiment 2

As shown in FIG. 1, the photoelectric autocollimation apparatus based on beam drift compensation, which employs a reference mirror to reflect the reference beam, mainly comprising an autocollimator, a beam steering device 8, a measurement mirror 12a, a data processing controller 7 and a beam drift monitoring and separating unit based on reference mirror 11a:

The autocollimator mainly comprising a laser source 1, a reticle 2, a polarization-insensitive beamsplitter 3, collimating lens 9 and a first photoelectric position sensor 6 which is positioned on the focal plane of the collimating lens 9 in the reflection direction of the polarization-insensitive beamsplitter 3. The output signal of the first photoelectric position sensor 6 is transferred to the data processing controller 7, which calculates the angular deflection of the measurement mirror 12a according to this output signal.

A beam steering device 8 is positioned right in front of collimating lens 9, which comprising a beam steering actuator and a driving mechanism. It is also connected to data processing controller 7 to control the deflection of beam steering device 8.

The measurement mirror 12a is positioned on the object being measured, and it deflects with the object being measured.

The beam drift monitoring and separating unit based on reference mirror 11a comprising first a polarizing beamsplitter 10, a reference mirror 11a, a second polarizing beam splitter 5 and a second photoelectric position sensor 4. The first polarizing beamsplitter 10 is positioned between the beam steering device 8 and the measurement mirror 12a, and it is close to the measurement mirror 12a, with its transmission direction opposite to the measurement mirror 12a. The reference mirror 11a is positioned opposite to the reflection direction of the first polarizing beamsplitter 10, and it is fastened steadily in the measurement process. The second polarizing beam splitter 5 is positioned in the reflection direction of the polarization-insensitive beamsplitter 3, and between the polarization-insensitive beamsplitter 3 and the focal plane of the collimating lens 9. The second photoelectric position sensor 4 is positioned on the focal plane of the collimating lens 9 in the reflection direction of the second polarizing beam splitter 5. The output signal of the second photoelectric position sensor 4 is transferred to the data processing controller 7, which calculates the magnitude of beam drift according to this output signal. In this apparatus the laser beam emitted from the laser source 1 can be a circular polarized beam, an elliptical polarized beam, a perpendicular polarized beam, or a linear polarized beam with the polarization plane uncoincident with the transmitted or reflected polarization plane of the first polarizing beamsplitter 10.

Here is an example of the proposed autocollimation apparatus as shown in FIG. 1, with the laser source 1 emitting a perpendicular linear polarized beam. The description of the working process is as follows: A collimated beam is formed by passing a perpendicular linear polarized beam emitted from the laser source 1 through the reticle 2, the polarization-insensitive beamsplitter 3 and the collimating lens 9 successively. The collimated beam is reflected by the beam steering device 8, into the first polarizing beamsplitter 10 as the incident. The first polarizing beamsplitter 10 splits the incident beam into a polarized transmitted beam and a polarized reflected beam, which are polarized with the polarization states mutually perpendicular to each other. The obtained polarized transmitted beam is reflected by the measurement mirror 12a, and then formulated as the measurement beam. The obtained polarized reflected beam is reflected by the reference mirror 11a, which is fastened steadily in the measurement process, and then formulated as the reference beam. The described measurement beam carries the two-dimensional angular deflection information of the measurement mirror 12a and the angular beam drift information in the measurement process, and the described reference beam carries only the angular beam drift information in the measurement process. The described measurement beam transmits through the first polarizing beamsplitter 10 again and returns reversely to the polarization-insensitive beamsplitter 3. The described reference beam is reflected by the first polarizing beamsplitter 10 again and returns reversely to the polarization-insensitive beamsplitter 3 on a common path with the measurement beam. So the drifts of the reference and measurement beams are exactly the same. Each of the two beams is then splitted into two beams (i.e. both in transmitive and reflective form) by the polarization-insensitive beamsplitter 3, and the reflected beams of the polarization-insensitive beamsplitter 3 which consist of the reflected reference beam and the reflected measurement beam are transmitted to the second polarizing beamsplitter 5.

The second polarizing beamsplitter 5 splits the two beams into the measurement beam which is transmitted and the reference beam which is reflected respectively, due to the perpendicular polarization states of the two beams. The measurement beam is then received by the first photoelectric position sensor 6 and the output signal of the first photoelectric position sensor 6 is transferred to the data processing controller 7 as the measurement signal. The reference beam is received by the second photoelectric position sensor 4, and the output signal of the second photoelectric position sensor 4 is transferred to the data processing controller 7 as the reference signal. The magnitude of beam drift according to the reference signal is measured by data processing controller 7 using $$\varepsilon = \arctan\left(\frac{\Delta d_{ref}}{f}\right),$$

where $\Delta d_{ref}$ is the position of the spot formed by the reference beam on second photoelectric position sensor 4 with respect to the null position during every sampling period, and f is the focal length of the collimating lens 9. The data processing controller 7 gives out a signal to the beam steering device 8 to deflect the directions of measurement and reference beams simultaneously to the opposite direction of beam drift. The spatial angular deflections of the two beams adjusted by the beam steering device 8 can be calculated using φ=ε. The angular deflection of the measurement mirror 12a which deflects with the object being measured can be calculated using $$\theta = \frac{1}{2}\arctan\left(\frac{\Delta d_m}{f}\right),$$

where $\Delta d_m$ is the position of the spot formed by the measurement beam on the first photoelectric position sensor 6 with respect to the null position during every sampling period.

Preferred Embodiment 3

Figure 2:
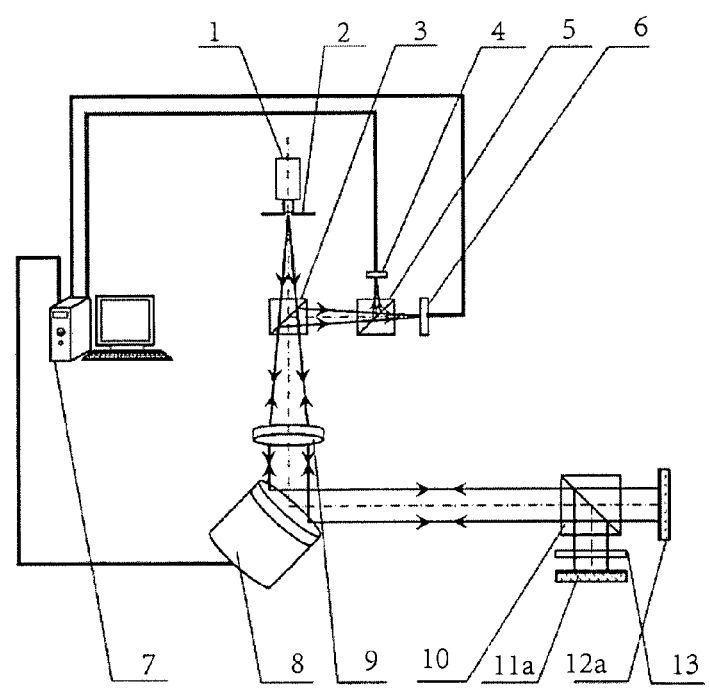
FIG. 2: construction of the photoelectric autocollimation apparatus proposed in preferred embodiment 2.
Figure 7:
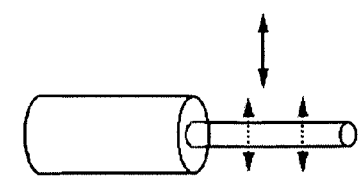
FIG. 7: block diagram of the linear polarized beam emitted from the laser source.

As shown in FIG. 2, this embodiment includes a first ¼ wave plate 13, and in this embodiment the first polarizing beamsplitter 10 is replaced by a second polarization-insensitive beamsplitter 10. In this embodiment, all the other constitutions remain the same as those in preferred embodiment 2. The first ¼ wave plate 13 is positioned between the second polarization-insensitive beamsplitter 10 and the reference mirror 11a. The laser beam emitted from the laser source 1 is a linear polarized beam as shown in FIG. 7 with the polarization plane coincident with the transmitted polarization plane of the second polarizing beamsplitter 5.

Preferred Embodiment 4

Figure 3:
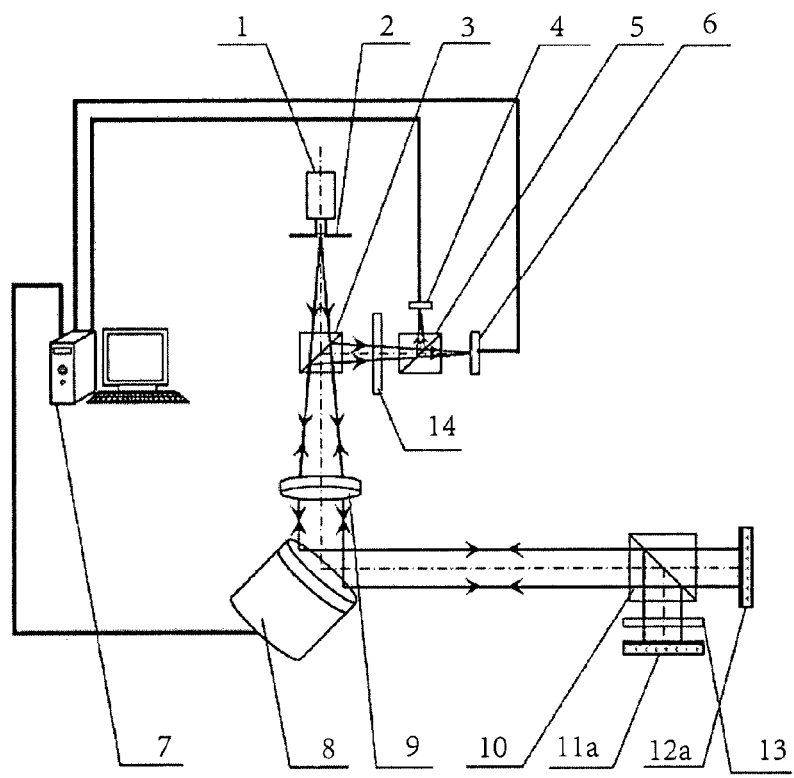
FIG. 3: construction of the photoelectric autocollimation apparatus proposed in preferred embodiment 3.
Figure 4:
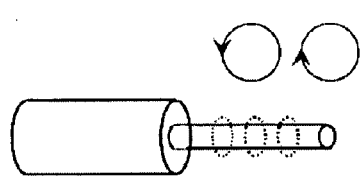
FIG. 4: block diagram of the circular polarized beam emitted from the laser source.
Figure 6:
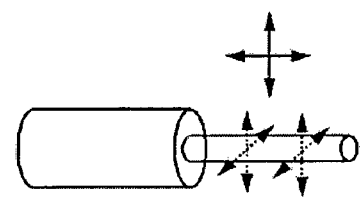
FIG. 6: block diagram of the perpendicular polarized beam emitted from the laser source.
Figure 5:
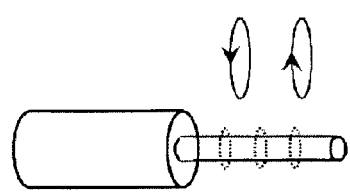
FIG. 5: block diagram of the elliptical polarized beam emitted from the laser source.

As shown in FIG. 3, this embodiment further includes a second ¼ wave plate 14 with all the other constitutions exactly the same as those in preferred embodiment 3. The second ¼ wave plate 14 is positioned between the second polarizing beamsplitter 5 and the polarization-insensitive beamsplitter 3. The fast axis of the second ¼ wave plate 14 is coincident with the transmitted polarization plane of the second polarizing beamsplitter 5. The laser beam emitted from the laser source 1 is a circular polarized beam as shown in FIG. 4, or an elliptical polarized beam as shown in FIG. 5.

Here is another example of the proposed autocollimation apparatus as shown in FIG. 3, with the laser source 1 emitting a circular polarized beam. In this apparatus the first polarizing beamsplitter 10 is actually replaced by a polarization-insensitive beamsplitter, but it is still called the first polarizing beamsplitter 10 here.

The description of the working process is as follows: A collimated beam is formed by passing a circular polarized beam emitted from the laser source 1 through the reticle 2, the polarization-insensitive beamsplitter 3 and the collimating lens 9 successively. The collimated beam is reflected by the beam steering device 8, into the first polarizing beamsplitter 10 as the incident. the first polarizing beamsplitter 10 splits the incident beam into a polarized transmitted beam and a polarized reflected beam, while the circular polarization states of the two beams remain unchanged. The obtained polarized transmitted beam is reflected by the measurement mirror 12a, and then formulated as a measurement beam. The measurement beam carries the two-dimensional angular deflection information of the measurement mirror 12a and the angular beam drift information in the measurement process. The measurement beam transmits through the first polarizing beamsplitter 10 again and returns reversely to the polarization-insensitive beamsplitter 3, while the circular polarization state remains unchanged.

The obtained polarized reflected beam is reflected by the reference mirror 11a after it transmits through the first ¼ wave plate 13, and then formulated as a reference beam. The reference beam carries only the angular beam drift information in the measurement process. The reference beam transmits through the first ¼ wave plate 13 again, and it is reflected by the first polarizing beamsplitter 10. The circular polarization state of the reference beam is reversed due to passing through the first ¼ wave plate 13 twice. The reference beam returns reversely to the polarization-insensitive beamsplitter 3 on a common path with the measurement beam, with the polarization states reversed to each other. So the drifts of the reference and measurement beams are exactly the same. Each of the two beams is then splitted into two beams by the polarization-insensitive beamsplitter 3, and the reflected beams of the polarization-insensitive beamsplitter 3 which consist of the reflected measurement beam and the reflected reference beam are transmitted through the second ¼ wave plate 14. The reversed circular polarization states of the reflected measurement and reference beams are changed into the perpendicular linear polarization states. The fast axis of the second ¼ wave plate 14 can be adjusted to make sure that the reflected measurement beam which is a linear polarized beam can completely transmits through the second polarizing beamsplitter 5, and the reflected reference beam with its linear polarization state perpendicular to the reflected measurement beam is reflected by the second polarizing beamsplitter 5.

The reflected measurement beam is then received by the first photoelectric position sensor 6, and its output signal is transferred to the data processing controller 7 as a measurement signal. The reflected reference beam is received by second photoelectric position sensor 4, and the output signal of which is transferred to the data processing controller 7 as a reference signal. The magnitude of beam drift according to the reference signal can be calculated by the data processing controller 7 using $$\varepsilon = \arctan\left(\frac{\Delta d_{ref}}{f}\right),$$

where $\Delta d_{ref}$ is the position of the spot formed by the reference beam on the second photoelectric position sensor 4 with respect to the null position during every sampling period, and f is the focal length of collimating lens 9. The data processing controller 7 then gives out a signal to the beam steering device 8 to deflect the directions of measurement and reference beams simultaneously to the opposite direction of beam drift. The spatial angular deflections of the two beams adjusted by the beam steering device 8 can be calculated using $\phi=\varepsilon$. The angular deflection of the measurement mirror 12a which deflects with the object being measured can be calculated using $$\theta = \frac{1}{2}\arctan\left(\frac{\Delta d_m}{f}\right),$$

where $\Delta d_m$ is the position of the spot formed by the measurement beam on the first photoelectric position sensor 6 with respect to the null position during every sampling period.

Preferred Embodiment 5

Figure 18:
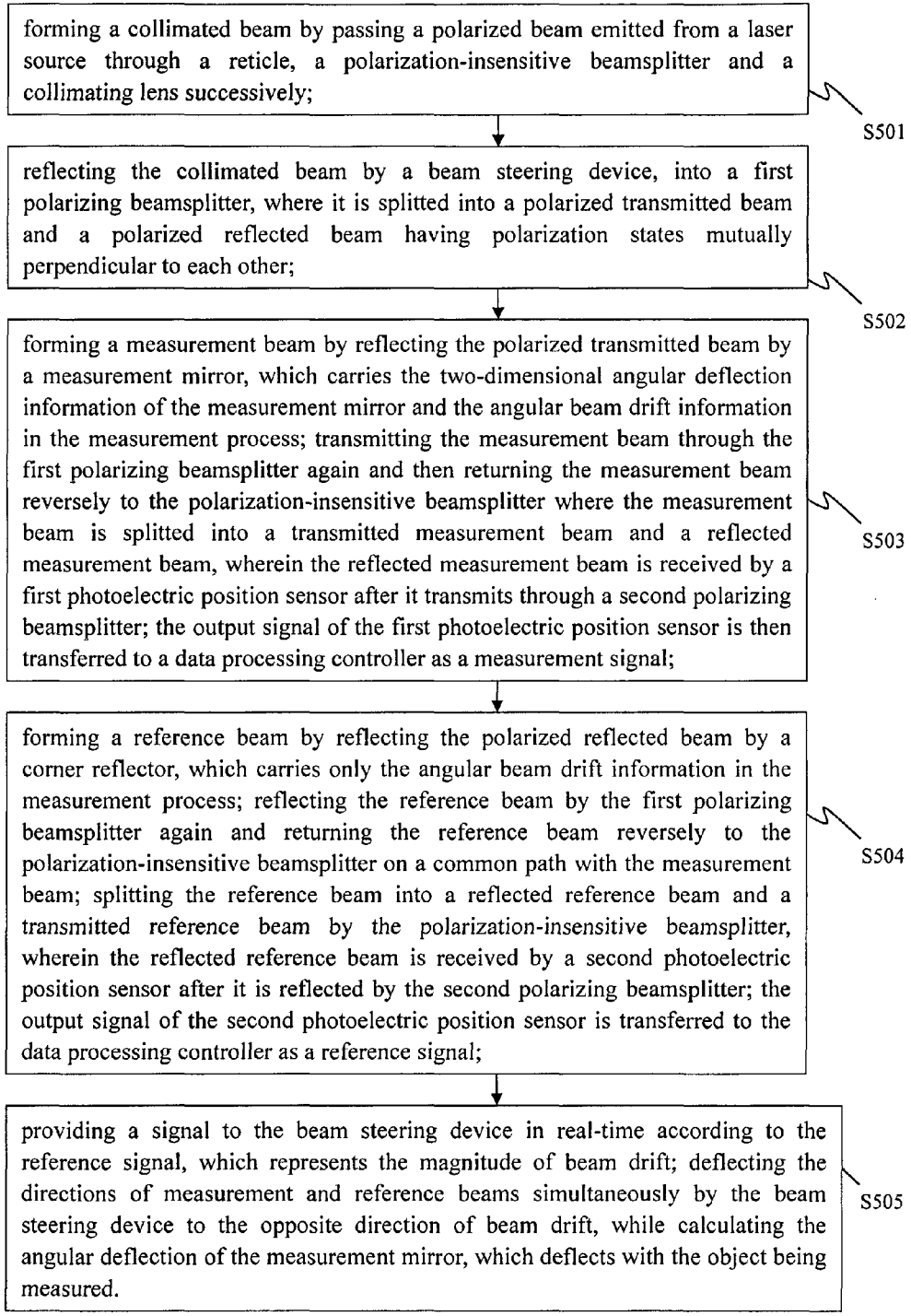
FIG. 18: flow diagram of the photoelectric autocollimation method based on beam drift compensation, which employs a corner reflector to reflect the reference beam.

As shown in FIG. 18, the proposed photoelectric autocollimation method based on beam drift compensation, which employs a corner reflector to reflect the reference beam, comprises the steps of:

S501: A collimated beam is formed by passing a polarized beam emitted from a laser source through a reticle, a polarization-insensitive beamsplitter and a collimating lens successively;

S502: The collimated beam is reflected by a beam steering device, into a first polarizing beamsplitter, which splits it into a polarized transmitted beam and a polarized reflected beam, so that both the transmitted and reflected beams are polarized with the polarization states mutually perpendicular to each other;

S503: The polarized transmitted beam obtained in S502 is reflected by the measurement mirror, and then formulated as a measurement beam. The described measurement beam carries the two-dimensional angular deflection information of the measurement mirror and the angular beam drift information in the measurement process. The described measurement beam transmits through the first polarizing beamsplitter again and returns reversely to the polarization-insensitive beamsplitter. The beam is then splitted into two beam (i.e. transmitted measurement and reflected measurement beams) by the polarization-insensitive beamsplitter, and its reflected measurement beam is received by the first photoelectric position sensor after it transmits through the second polarizing beamsplitter. The output signal of the first photoelectric position sensor is transferred to the data processing controller as the measurement signal;

S504: The polarized reflected beam obtained in S502 is reflected by a corner reflector, and then formulated as a reference beam. The described reference beam carries only the angular beam drift information in the measurement process. The described reference beam is reflected by the first polarizing beamsplitter again and returns reversely to the polarization-insensitive beamsplitter on a common path with the measurement beam; The beam is then splitted into two beam (i.e. transmitted reference and reflected reference beams) by the polarization-insensitive beamsplitter, and its reflected reference beam is received by a second photoelectric position sensor after it is reflected by the second polarizing beamsplitter. The output signal of the second photoelectric position sensor is transferred to the data processing controller as a reference signal;

S505: The data processing controller gives out a signal to the beam steering device in real-time according to the reference signal, which represents the magnitude of beam drift;

The directions of measurement and reference beams are simultaneously deflected by the beam steering device to the opposite direction of beam drift, while the data processing controller calculates the angular deflection of the measurement mirror, which deflects with the object being measured.

The magnitude of beam drift in this method is calculated by:

$$\varepsilon = \arctan\left(\frac{\Delta d_{ref}}{f}\right),$$

where $\Delta d_{ref}$ is the position of the spot formed by the reference beam on the second photoelectric position sensor with respect to the null position during every sampling period, and f is the focal length of the collimating lens.

The spatial angular deflections of measurement and reference beams adjusted by the beam steering device in this method, is calculated using $\phi=\varepsilon$.

The angular deflection of the measurement mirror in this method, which deflects with the object being measured, is calculated by:

$$\theta = \frac{1}{2}\arctan\left(\frac{\Delta d_m}{f}\right),$$

where $\Delta d_m$ is the position of the spot formed by the measurement beam on the first photoelectric position sensor with respect to the null position during every sampling period.

Preferred Embodiment 6

Figure 8:
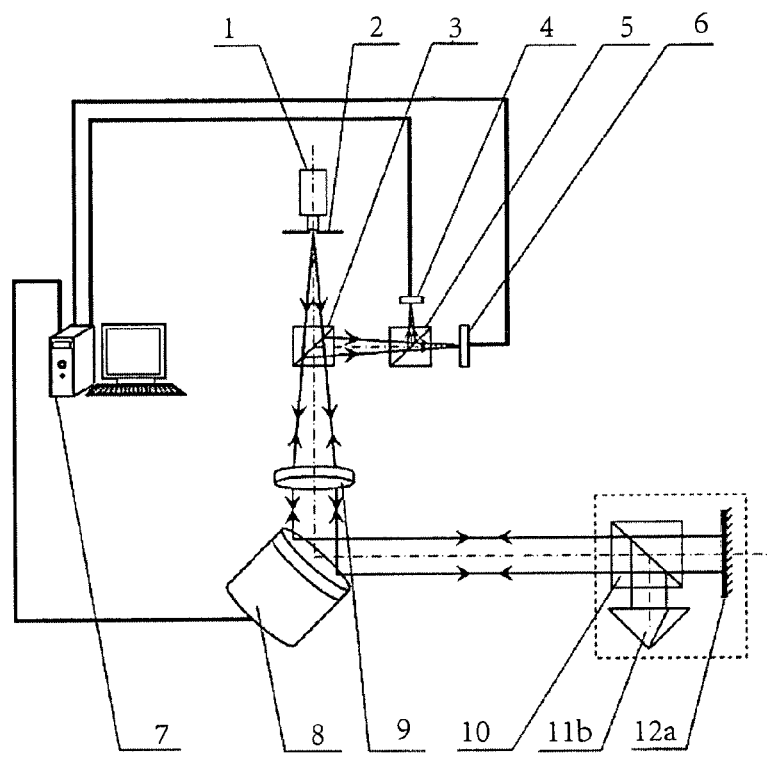
FIG. 8: construction of the photoelectric autocollimation apparatus proposed in preferred embodiment 4.

As shown in FIG. 8, the photoelectric autocollimation apparatus based on beam drift compensation, which employs corner reflector 11b to reflect the reference beam, mainly comprising an autocollimator, a beam steering device 8, a measurement mirror 12a, a data processing controller 7 and a beam drift monitoring and separating unit based on a corner reflector 11b.

The autocollimator mainly comprising a laser source 1, a reticle 2, a polarization-insensitive beamsplitter 3, a collimating lens 9 and a first photoelectric position sensor 6 which is positioned on the focal plane of the collimating lens 9 in the reflection direction of the polarization-insensitive beamsplitter 3. The output signal of the first photoelectric position sensor 6 is transferred to the data processing controller 7, which calculates the angular deflection of the measurement mirror 12a according to this output signal.

The beam steering device 8 is positioned right in front of the collimating lens 9, which comprising a beam steering actuator and a driving mechanism. It is also connected to the data processing controller 7 to control the deflection of the beam steering device 8.

The measurement mirror 12a is positioned on the object being measured, and it deflects with the object being measured.

The beam drift monitoring and separating unit based on the corner reflector 11b comprising a first polarizing beamsplitter 10, a corner reflector 11b, a second polarizing beam splitter 5 and a second photoelectric position sensor 4. The first polarizing beamsplitter 10 is positioned between the beam steering device 8 and the measurement mirror 12a, and it is close to the measurement mirror 12a, with its transmission direction opposite to the measurement mirror 12a. The corner reflector 11b is positioned opposite to the reflection direction of the first polarizing beamsplitter 10. The first polarizing beamsplitter 10, the corner reflector 11b and the measurement mirror 12a are fastened into an assembly, which deflects with the object being measured. The second polarizing beam splitter 5 is positioned in the reflection direction of the polarization-insensitive beamsplitter 3, and between the polarization-insensitive beamsplitter 3 and the focal plane of the collimating lens 9. The second photoelectric position sensor 4 is positioned on the focal plane of the collimating lens 9 in the reflection direction of the second polarizing beam splitter 5. The output signal of the second photoelectric position sensor 4 is transferred to the data processing controller 7, which calculates the magnitude of beam drift according to this output signal.

In this apparatus the laser beam emitted from the laser source 1 can be a circular polarized beam, an elliptical polarized beam, a perpendicular polarized beam, or a linear polarized beam with the polarization plane uncoincident with the transmitted or reflected polarization plane of the first polarizing beamsplitter 10.

Figure 11:
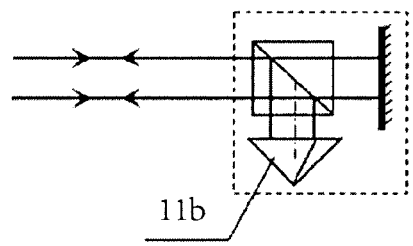
FIG. 11: block diagram of the cube-corner reflector in the beam drift monitoring and separating unit.
Figure 12:
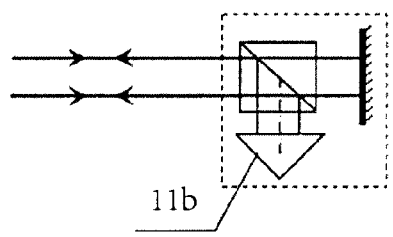
FIG. 12: block diagram of the right-angle conical corner reflector with the apex angle of 90° in the beam drift monitoring and separating unit.

In this preferred embodiment, corner reflector 11b as shown in FIG. 11 can be a cube-corner reflector as shown in FIG. 11, or a right-angle conical corner reflector as shown in FIG. 12.

Preferred Embodiment 7

Figure 9:
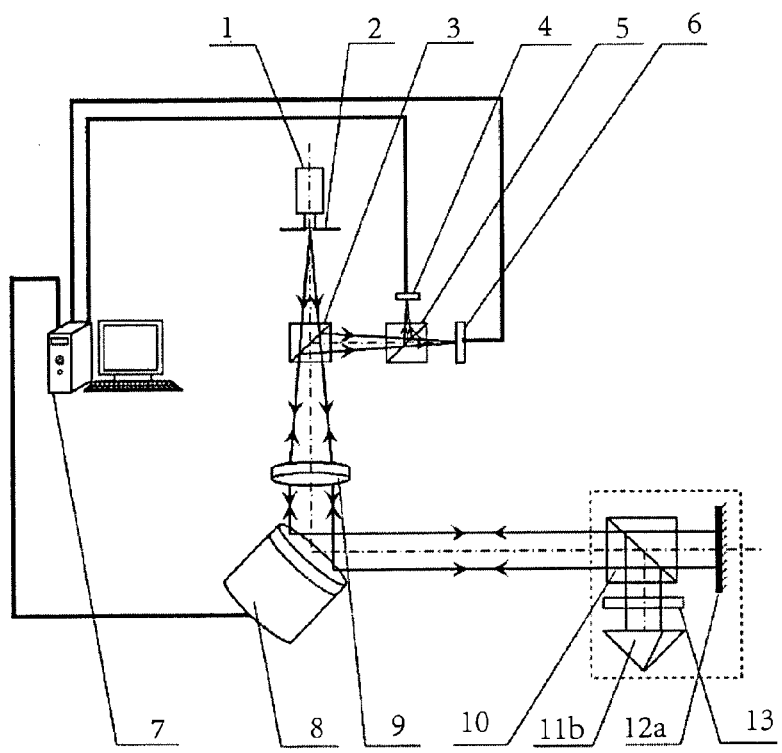
FIG. 9: construction of the photoelectric autocollimation apparatus proposed in preferred embodiment 5.

As shown in FIG. 9, this embodiment further includes the first ¼ wave plate 13, and the first polarizing beamsplitter 10 is replaced by a second polarization-insensitive beamsplitter. All the other constitutions remain the same as those in preferred embodiment 6. In this apparatus, the second polarization-insensitive beamsplitter 10, the corner reflector 11b, the measurement mirror 12a and the first ¼ wave plate 13 are fastened into an assembly, which deflects with the object being measured. The first ¼ wave plate 13 is positioned between the second polarization-insensitive beamsplitter 10 and the corner reflector 11b. The laser beam emitted from the laser source 1 is a linear polarized beam as shown in FIG. 7 with the polarization plane coincident with the transmitted polarization plane of the second polarizing beamsplitter 5.

Preferred Embodiment 8

Figure 10:
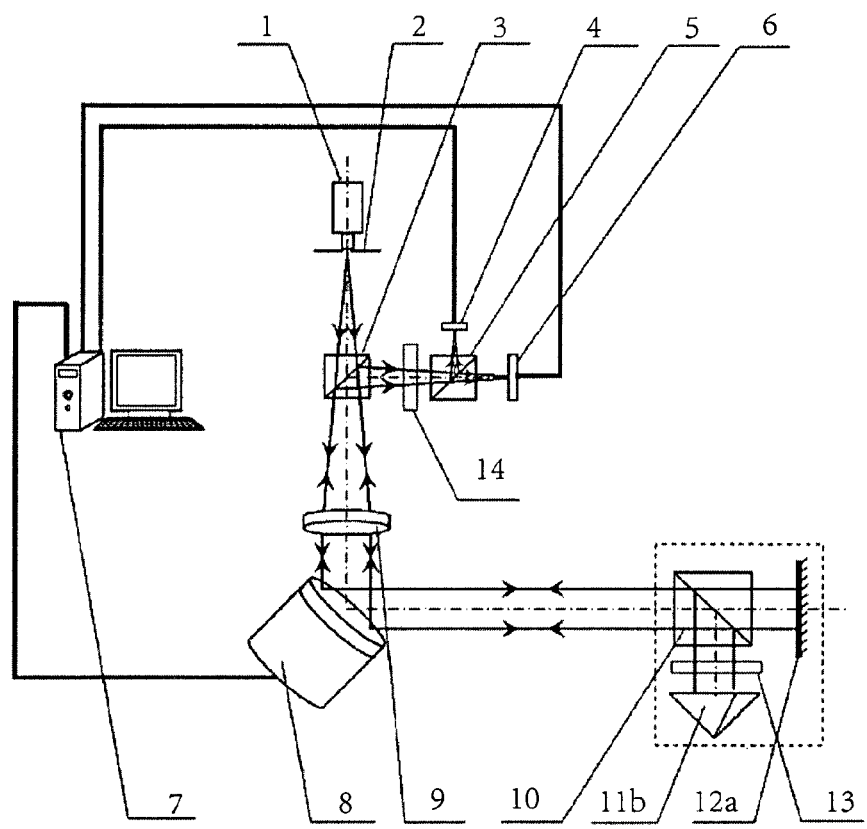
FIG. 10: construction of the photoelectric autocollimation apparatus proposed in preferred embodiment 6.

As shown in FIG. 10, this embodiment further includes a second ¼ wave plate 14 with all the other constitutions remaining the same as those in preferred embodiment 7. The second ¼ wave plate 14 is positioned between the second polarizing beamsplitter 5 and the polarization-insensitive beamsplitter 3. The fast axis of the second ¼ wave plate is coincident with the transmitted polarization plane of the second polarizing beamsplitter 5. The laser beam emitted from the laser source 1 is a circular polarized beam as shown in FIG. 4, or an elliptical polarized beam as shown in FIG. 5.

Here is another example of the proposed autocollimation apparatus as shown in FIG. 10, with laser source 1 emitting a circular polarized beam. In this apparatus the first polarizing beamsplitter 10 is actually replaced by a polarization-insensitive beamsplitter, and it is called a second polarization-insensitive beamsplitter 10 here. The description of the working process is as follows: A collimated beam is formed by passing a circular polarized beam emitted from the laser source 1 through the reticle 2, the polarization-insensitive beamsplitter 3 and the collimating lens 9 successively. The collimated beam is reflected by the beam steering device 8, into the second polarization-insensitive beamsplitter 10 as the incident. The second polarization-insensitive beamsplitter 10 splits the incident beam into a transmitted beam and a reflected beam, while the circular polarization states of the two beams remain unchanged. The obtained transmitted beam is reflected by the measurement mirror 12a, and then formulated as a measurement beam. The measurement beam carries the two-dimensional angular deflection information of measurement mirror 12a and the angular beam drift information in the measurement process. The measurement beam transmits through the second polarization-insensitive beamsplitter 10 again and returns reversely to the polarization-insensitive beamsplitter 3, while the circular polarization state remains unchanged. The obtained reflected beam is reflected by the corner reflector 11b after it transmits through the first ¼ wave plate 13, and then formulated as a reference beam. The reference beam carries only the angular beam drift information in the measurement process. The reference beam transmits through the first ¼ wave plate 13 again, and it is reflected by the second polarization-insensitive beamsplitter 10. The circular polarization state of the reference beam is reversed due to passing through the first ¼ wave plate 13 twice. The reference beam returns reversely to the polarization-insensitive beamsplitter 3 on a common path with the measurement beam, with the polarization states reversed to each other. So the drifts of the reference and measurement beams are exactly the same. Each of the two beams is then splitted into two beams by the polarization-insensitive beamsplitter 3, and the reflected beams of the polarization-insensitive beamsplitter 3 which consist of the reflected measurement beam and the reflected reference beam are transmitted through the second ¼ wave plate 14. The reversed circular polarization states of the reflected measurement beam and the reflected reference beam are changed into the perpendicular linear polarization states.

The fast axis of the second ¼ wave plate 14 can be adjusted to make sure that the reflected measurement beam which is a linear polarized beam can completely transmits through the second polarizing beamsplitter 5, and the reflected reference beam with its linear polarization state perpendicular to the reflected measurement beam is reflected by the second polarizing beamsplitter 5. The reflected measurement beam is then received by the first photoelectric position sensor 6, and its output signal is transferred to the data processing controller 7 as the measurement signal.

The reflected reference beam is received by the second photoelectric position sensor 4, and the output signal of which is transferred to the data processing controller 7 as the reference signal. The magnitude of beam drift according to the reference signal can be calculated by the data processing controller 7 using $$\varepsilon = \arctan\left(\frac{\Delta d_{ref}}{f}\right),$$

where $\Delta d_{ref}$ is the position of the spot formed by the reference beam on the second photoelectric position sensor 4 with respect to the null position during every sampling period, and f is the focal length of the collimating lens 9. The data processing controller 7 then gives out a signal to the beam steering device 8 to deflect the directions of measurement and reference beams simultaneously to the opposite direction of beam drift. The spatial angular deflections of the two beams adjusted by the beam steering device 8 can be calculated using $\phi=\varepsilon$. The angular deflection of the measurement mirror 12a which deflects with the object being measured can be calculated using $$\theta = \frac{1}{2}\arctan\left(\frac{\Delta d_m}{f}\right),$$

where $\Delta d_m$ is the position of the spot formed by the measurement beam on the first photoelectric position sensor 6 with respect to the null position during every sampling period.

Preferred Embodiment 9

As shown in FIG. 19, the proposed photoelectric autocollimation method based on beam drift compensation, which employs a beam splitting target to reflect the reference beam, comprises the steps of:

S901: A collimated beam is formed by passing a polarized beam emitted from a laser source through a reticle, a polarization-insensitive beamsplitter and a collimating lens successively;

S902: The collimated beam is reflected by the beam steering device into the first polarizing beamsplitter; The collimated beam transmits to the beam splitting target as the incident after it transmits through the first polarizing beamsplitter. The beam splitting target spitted the incident beam into a polarized transmitted beam and a polarized reflected beam, while the polarization states of the two beams remain unchanged;

S903: The polarized reflected beam obtained in S902 is formulated as the measurement beam. The described measurement beam carries the two-dimensional angular deflection information of the beam splitting target and the angular beam drift information in the measurement process;

The described measurement beam transmits through the first polarizing beamsplitter again and return reversely to the polarization-insensitive beamsplitter. The measurement beam is then spitted into two beams by the polarization-insensitive beamsplitter, and its reflected beam is received by the first photoelectric position sensor after it transmits through the second polarizing beam splitter. The output signal of the first photoelectric position sensor is transferred to the data processing controller as the measurement signal;

S904: The transmitted beam obtained in S902 is reflected back by the beam splitting target, and then formulated as the reference beam. The described reference beam carries only the angular beam drift information in the measurement process. The described reference beam is reflected by a mirror to the first polarizing beamsplitter, after it transmits through the ½ wave plate. The described reference beam is reflected by the first polarizing beamsplitter again and returns reversely to the polarization-insensitive beamsplitter on a common path with the measurement beam. The beam is then splitted into two beams by the polarization-insensitive beamsplitter, and its reflected beam is received by the second photoelectric position sensor after it is reflected by the second polarizing beamsplitter. The output signal of the second photoelectric position sensor is transferred to the data processing controller as the reference signal;

S905: The data processing controller gives out a signal to the beam steering device in real-time according to the reference signal, which represents the magnitude of beam drift. The directions of the measurement and reference beams are simultaneously deflected by the beam steering device to the opposite direction of beam drift, while the data processing controller calculates the angular deflection of the beam splitting target, which deflects with the object being measured.

The magnitude of beam drift in this method is calculated by:

$$\varepsilon = \arctan\left(\frac{\Delta d_{ref}}{f}\right),$$

where $\Delta d_{ref}$ is the position of the spot formed by the reference beam on the second photoelectric position sensor with respect to the null position during every sampling period, and f is the focal length of the collimating lens.

The spatial angular deflections of measurement and reference beams adjusted by the beam steering device in this method, is calculated using $\phi=\varepsilon$. The angular deflection of the measurement mirror in this method, which deflects with the object being measured, is calculated by:

$$\theta = \frac{1}{2}\arctan\left(\frac{\Delta d_m}{f}\right),$$

where $\Delta d_m$ is the position of the spot formed by the measurement beam on the first photoelectric position sensor with respect to the null position during every sampling period.

Preferred Embodiment 10

Figure 13:
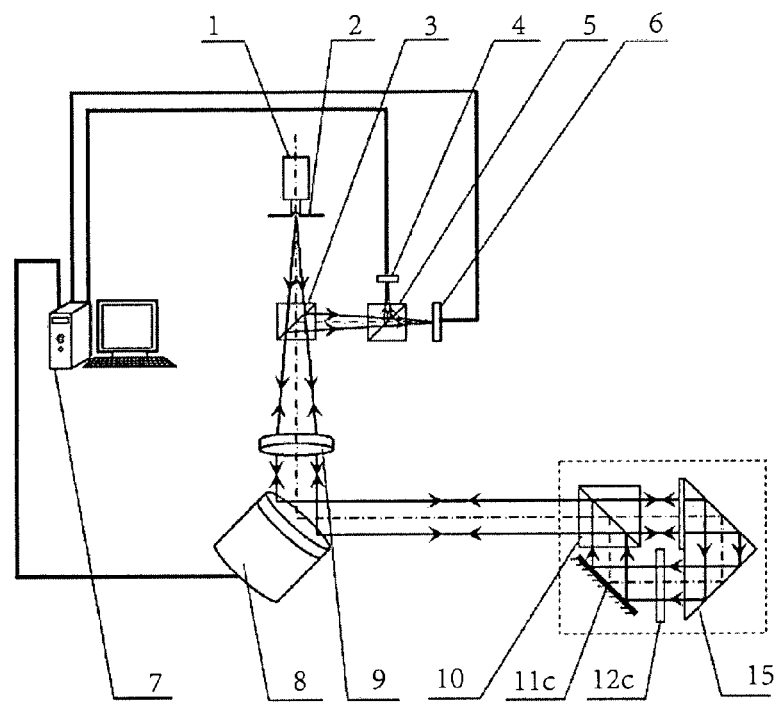
FIG. 13: construction of the photoelectric autocollimation apparatus proposed in preferred embodiment 7.

As shown in FIG. 13, the photoelectric autocollimation apparatus based on beam drift compensation, which employs a beam splitting target 15 to reflect the reference beam, mainly comprising an autocollimator, a beam steering device 8, a beam splitting target 15, a data processing controller 7 and a beam drift monitoring and separating unit based on a beam splitting target 15.

The autocollimator mainly comprising a laser source 1, a reticle 2, a polarization-insensitive beamsplitter 3, a collimating lens 9 and a first photoelectric position sensor 6 which is positioned on the focal plane of the collimating lens 9 in the reflection direction of the polarization-insensitive beamsplitter 3. The output signal of the first photoelectric position sensor 6 is transferred to the data processing controller 7, which calculates the angular deflection of the beam splitting target 15 according to this output signal.

The beam steering device 8 is positioned right in front of the collimating lens 9, which comprising a beam steering actuator and a driving mechanism. It is also connected to the data processing controller 7 to control the deflection of the beam steering device 8.

The beam splitting target 15 is positioned on the object being measured, and it deflects with the object being measured.

The beam drift monitoring and separating unit based on the beam splitting target 15 comprising a first polarizing beamsplitter 10, a mirror 11c, a ½ wave plate 12c, a beam splitting target 15, a second polarizing beamsplitter 5 and a second photoelectric position sensor 4. The beam splitting target 15 is a prism with half of its slope coated with semi-reflective coating film and the other half uncoated. The beam splitting target 15 is positioned on the object being measured, and it deflects with the object being measured. The first polarizing beamsplitter 10 is positioned between the beam steering device 8 and the beam splitting target 15, and it is close to the beam splitting target 15, with its transmission direction aiming at the coated half slope of the beam splitting target 15. The mirror 11c is positioned 45° with respect to the uncoated half slope of the beam splitting target 15 and 45° with respect to the reflection direction of the first polarizing beamsplitter 10. The ½ wave plate 12c is positioned between the uncoated half slope of the beam splitting target 15 and the mirror 11c. The first polarizing beamsplitter 10, the mirror 11c, the ½ wave plate 12c and the beam splitting target 15 are fastened into an assembly, which deflects with the object being measured. The second polarizing beamsplitter 5 is positioned in the reflection direction of the polarization-insensitive beamsplitter 3, between the polarization-insensitive beamsplitter 3 and the focal plane of the collimating lens 9. The second photoelectric position sensor 4 is positioned on the focal plane of the collimating lens 9 in the reflection direction of the second polarizing beam splitter 5. The output signal of the second photoelectric position sensor 4 is transferred to the data processing controller 7, which calculates the magnitude of beam drift according to this output signal.

In this apparatus, the laser beam emitted from the laser source 1 is a linear polarized beam with the polarization plane coincident with the transmitted polarization plane of the first polarizing beam splitter 10.

Figure 14:
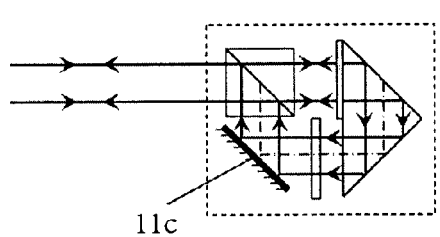
FIG. 14: block diagram of the plane mirror in the beam drift monitoring and separating unit in preferred embodiment 7.
Figure 16:
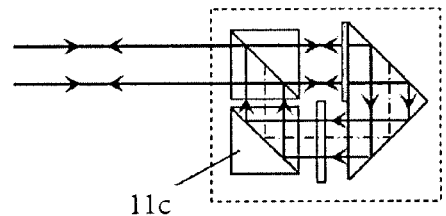
FIG. 16: block diagram of the polarized beam splitter in the beam drift monitoring and separating unit in preferred embodiment 7.
Figure 15:
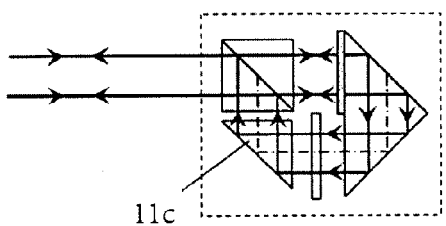
FIG. 15: block diagram of the total reflection prism in the beam drift monitoring and separating unit in preferred embodiment 7.

In this embodiment mirror 11c can be a plane mirror as shown in FIG. 14, a total reflection prism as shown in FIG. 15, or a polarizing beamsplitter with the reflected polarization plane coincident with the first polarizing beamsplitter 10 as shown in FIG. 16.

Here is another example of the proposed autocollimation apparatus as shown in FIG. 13, with the laser source 1 emitting a linear polarized beam as shown in FIG. 7. The description of the working process is as follows: A collimated beam is formed by passing a linear polarized beam emitted from laser source 1 through the reticle 2, the polarization-insensitive beamsplitter 3 and the collimating lens 9 successively. The collimated beam is reflected by the beam steering device 8, into the first polarizing beamsplitter 10 as the incident. The linear polarization plane of the beam is adjusted to make sure that the beam can completely transmit through the first polarizing beamsplitter 10, and the beam is then splitted into a polarized reflected beam and a polarized transmitted beam by the semi-reflective coating film of the beam splitting target 15. The polarized reflected beam obtains the information of two-dimensional angular deflection of the beam splitting target 15, and is then formulated as a measurement beam. The measurement beam carries the two-dimensional angular deflection information of the beam splitting target 15 and the angular beam drift information in the measurement process. The measurement beam transmits through the first polarizing beamsplitter 10 again and returns reversely to the polarization-insensitive beamsplitter 3, with the polarization state unchanged. The polarized transmitted beam goes out through the uncoated half slope of the beam splitting target 15, and then formulated as a reference beam. The reference beam carries only the angular beam drift information in the measurement process. The reference beam transmits through the ½ wave plate 12, and the linear polarization state is then perpendicularly changed. The reference beam is reflected by the mirror 11c and the first polarizing beamsplitter 10 successively, and returns to the polarization-insensitive beamsplitter 3 on a common path with the measurement beam, with polarization states perpendicular to each other. So the drifts of the reference and measurement beams are exactly the same. Each of the two beams is then splitted into two beams by the polarization-insensitive beamsplitter 3, and the reflected beams of the polarization-insensitive beamsplitter 3 which consist of the reflected measurement beam and the reflected reference beam are transmitted to the second polarizing beamsplitter 5.

The second polarizing beamsplitter 5 splits the two beams into the reflected measurement beam which is transmitted and the reflected reference beam which is reflected respectively, due to the perpendicular polarized states of the two beams. The reflected measurement beam is received by the first photoelectric position sensor 6, and its output signal is transferred to the data processing controller 7 as the measurement signal. The reflected reference beam is received by the second photoelectric position sensor 4, and its output signal is transferred to the data processing controller 7 as the reference signal. The magnitude of beam drift can be measured by the data processing controller 7 according to the reference signal using $$\varepsilon = \arctan\left(\frac{\Delta d_{ref}}{f}\right),$$

where $\Delta d_{ref}$ is the position of the spot formed by the reference beam on the second photoelectric position sensor 4 with respect to the null position during every sampling period, and f is the focal length of the collimating lens 9. The data processing controller 7 can then give out a signal to the beam steering device 8, which deflects the measurement and reference beams simultaneously to the opposite direction of beam drift. The spatial angular deflection of the two beams adjusted by the beam steering device 8 can be calculated using $\phi = \varepsilon$. The angular deflection of the beam splitting target 15 which deflects with the object being measured, can be calculated using $$\theta = \frac{1}{2}\arctan\left(\frac{\Delta d_m}{f}\right),$$

where $\Delta d_m$ is the position of the spot formed by the measurement beam on the first photoelectric position sensor 6 with respect to the null position during every sampling period.

What is claimed is:

1. A photoelectric autocollimation method based on beam drift compensation that employs a reference mirror or a corner reflector to reflect the reference beam, the method comprising:

forming a collimated beam by passing a polarized beam emitted from a laser source through a reticle, a polarization-insensitive beamsplitter and a collimating lens successively;

reflecting the collimated beam by a beam steering device into a first polarizing beamsplitter, where the collimated beam is split into a polarized transmitted beam and a polarized reflected beam having polarization states mutually perpendicular to each other;

forming a measurement beam by reflecting the polarized transmitted beam by a measurement mirror that carries the two-dimensional angular deflection information of the measurement mirror and the angular beam drift information in the measurement process;

transmitting the measurement beam through the first polarizing beamsplitter again and then returning the measurement beam reversely to the polarization-insensitive beamsplitter where the measurement beam is split into a transmitted measurement beam and a reflected measurement beam, the reflected measurement beam being received by a first photoelectric position sensor after it transmits through a second polarizing beamsplitter;

transferring the output signal of the first photoelectric position sensor to a data processing controller as a measurement signal;

forming a reference beam by reflecting the polarized reflected beam by a reference mirror or corner reflector that carries only the angular beam drift information in the measurement process;

reflecting the reference beam by the first polarizing beamsplitter again and returning the reference beam reversely to the polarization-insensitive beamsplitter on a common path with the measurement beam;

splitting the reference beam into a reflected reference beam and a transmitted reference beam by the polarization-insensitive beamsplitter, wherein the reflected reference beam is received by a second photoelectric position sensor after it is reflected by the second polarizing beamsplitter;

transferring the output signal of the second photoelectric position sensor to the data processing controller as a reference signal;

providing a signal to the beam steering device in real-time according to the reference signal that represents the magnitude of beam drift; and deflecting the directions of the measurement and reference beams simultaneously by the beam steering device to the opposite direction of beam drift, while calculating the angular deflection of the measurement mirror that deflects with the object being measured.

2. The method according to claim 1, wherein the magnitude of beam drift is calculated by:

$$\varepsilon = \arctan\left(\frac{\Delta d_{ref}}{f}\right),$$

where $\Delta d_{ref}$ is the position of the spot formed by the reference beam on the second photoelectric position sensor with respect to the null position during every sampling period, and f is the focal length of the collimating lens.

3. The method according to claim 1, wherein the spatial angular deflections of measurement and reference beams adjusted by the beam steering device is calculated using $\phi=\varepsilon$.

4. The method according to claim 1, wherein the angular deflection of the measurement mirror that deflects with the object being measured is calculated by:

$$\theta = \frac{1}{2}\arctan\left(\frac{\Delta d_m}{f}\right),$$

where $\Delta d_m$ is the position of the spot formed by the measurement beam on the first photoelectric position sensor with respect to the null position during every sampling period.

5. A photoelectric autocollimation apparatus comprising an autocollimator, a beam steering device, a measurement mirror, a data processing controller and a beam drift monitoring and separating unit based on a reference mirror or corner reflector;

the autocollimator comprising:
a laser source,
a reticle,
a polarization-insensitive beamsplitter,
a collimating lens and
a first photoelectric position sensor that is positioned on the focal plane of the collimating lens in the reflection direction of the polarization-insensitive beamsplitter, the output signal of the first photoelectric position sensor being transferred to the data processing controller that calculates the angular deflection of the measurement mirror according to the output signal;

wherein the beam steering device is positioned right in front of the collimating lens and comprises a beam steering actuator and a driving mechanism, the beam steering device being connected to the data processing controller to control so that the deflection of the beam steering device can be controlled;

wherein the measurement mirror is positioned on the object being measured, and deflects with the object being measured;

wherein, the beam drift monitoring and separating unit comprises:
a first polarizing beamsplitter,
a reference mirror or corner reflector,
a second polarizing beam splitter and
a second photoelectric position sensor;
wherein the first polarizing beamsplitter is positioned between the beam steering device and the measurement mirror, and is close to the measurement mirror, with its transmission direction opposite to the measurement mirror;
wherein the reference mirror or corner reflector is positioned opposite to the reflection direction of the first polarizing beamsplitter;
wherein the second polarizing beam splitter is positioned in the reflection direction of the polarization-insensitive beamsplitter, and between the polarization-insensitive beamsplitter and the focal plane of the collimating lens;
wherein the second photoelectric position sensor is positioned on the focal plane of the collimating lens in the reflection direction of the second polarizing beam splitter;
wherein the output signal of the second photoelectric position sensor is transferred to the data processing controller that calculates the magnitude of beam drift according to the output signal; and
wherein either the reference mirror is fastened steadily during the measurement process, or the first polarizing beamsplitter, the corner reflector and the measurement mirror are fastened into an assembly that deflects with the object being measured; and wherein the laser beam emitted from the laser source is a circular polarized beam, an elliptical polarized beam, a perpendicular polarized beam, or a linear polarized beam with the polarization plane uncoincident with the transmitted or reflected polarization plane of first polarizing beamsplitter.

6. A photoelectric autocollimation apparatus comprising an autocollimator, a beam steering device, a measurement mirror, a data processing controller and a beam drift monitoring and separating unit based on a reference mirror or corner reflector;

the autocollimator comprising:
  a laser source,
  a reticle,
  a polarization-insensitive beamsplitter,
  a collimating lens, and
  a first photoelectric position sensor that is positioned on the focal plane of the collimating lens in the reflection direction of polarization-insensitive beamsplitter, the output signal of the first photoelectric position sensor is being transferred to the data processing controller that calculates the angular deflection of the measurement mirror according to the output signal;
wherein the beam steering device is positioned right in front of the collimating lens and comprises a beam steering actuator and a driving mechanism, the beam steering device being connected to the data processing controller so that the deflection of the beam steering device can be controlled;
wherein the measurement mirror is positioned on the object being measured, and deflects with the object being measured;
wherein, the beam drift monitoring and separating unit comprises:
  a second polarization-insensitive beamsplitter,
  a reference mirror or corner reflector,
  a second polarizing beam splitter, and
  a second photoelectric position sensor,
  wherein the second polarization-insensitive beamsplitter is positioned between the beam steering device and the measurement mirror, and is close to the measurement mirror, with its transmission direction opposite to the measurement mirror;
  wherein the reference mirror or corner reflector is positioned opposite to the reflection direction of the second polarization-insensitive beamsplitter;
  wherein the second polarizing beam splitter is positioned in the reflection direction of the polarization-insensitive beamsplitter, and between the polarization-insensitive beamsplitter and the focal plane of the collimating lens;
  wherein the second photoelectric position sensor is positioned on the focal plane of the collimating lens in the reflection direction of the second polarizing beam splitter;
  wherein the output signal of the second photoelectric position sensor is transferred to the data processing controller that calculates the magnitude of beam drift according to the output signal;
wherein either the reference mirror is fastened steadily during the measurement process, or the second polarization-insensitive beamsplitter, the corner reflector and the measurement mirror are fastened into an assembly that deflects with the object being measured;
wherein the beam drift monitoring and separating unit further comprises a first ¼ wave plate that is positioned between the second polarization-insensitive beamsplitter and the reference mirror or corner reflector; and wherein the laser beam emitted from the laser source is a linear polarized beam with the polarization plane coincident with the transmitted polarization plane of second polarizing beam splitter.

7. The apparatus according to claim 6, wherein the beam drift monitoring and separating unit further comprises a second ¼ wave plate that is positioned between the second polarizing beamsplitter and the polarization-insensitive beamsplitter, the fast axis of the second ¼ wave plate being coincident with the transmitted polarization plane of the second polarizing beam splitter; and wherein the laser beam emitted from laser source is a circular polarized beam or an elliptical polarized beam.

8. The apparatus of claim 6, wherein the corner reflector of the beam drift monitoring and separating unit is a cube-corner reflector or a right-angle conical corner reflector.

9. A photoelectric autocollimation method based on beam drift compensation that employs a beam splitting target to reflect the reference beam, the method comprising:

forming a collimated beam by passing a polarized beam emitted from a laser source through a reticle, a polarization-insensitive beamsplitter and a collimating lens successively;

reflecting the collimated beam by the beam steering device into a first polarizing beamsplitter;

transmitting the collimated beam through the first polarizing beamsplitter to the beam splitting target, where the collimated beam is split into a polarized transmitted beam and a polarized reflected beam, remaining the polarization states of the two beams remaining unchanged;

using the polarized reflected beam as a measurement beam that carries the two-dimensional angular deflection information of the beam splitting target and the angular beam drift information in the measurement process;

transmitting the measurement beam through the first polarizing beamsplitter again and then returning the measurement beam reversely to the polarization-insensitive beamsplitter, where the measurement beam is split into a transmitted measurement beam and a reflected measurement beam, the reflected measurement beam being received by a first photoelectric position sensor after it transmits through a second polarizing beamsplitter;

transferring the output signal of the first photoelectric position sensor to a data processing controller as a measurement signal;

forming a reference beam by reflecting the polarized transmitted beam by the beam splitting target that carries only the angular beam drift information in the measurement process;

after transmitting the reference beam through ½ wave plate, reflecting the reference beam to the first polarizing beamsplitter by a mirror;

reflecting the reference beam by the first polarizing beamsplitter again and returning the reference beam reversely to the polarization-insensitive beamsplitter on a common path with the measurement beam;

splitting the reference beam into a reflected reference beam and a transmitted reference beam by the polarization-insensitive beamsplitter, the reflected reference beam being received by a second photoelectric position sensor after it is reflected by the second polarizing beamsplitter;

transferring the output signal of the second photoelectric position sensor to the data processing controller as a reference signal;

providing a signal to the beam steering device in real-time according to the reference signal that represents the magnitude of beam drift; and deflecting the directions of the measurement and reference beams simultaneously by the beam steering device to the opposite direction of beam drift, while calculating the angular deflection of the beam splitting target that deflects with the object being measured.

10. The method according to claim 9, wherein, the magnitude of beam drift is calculated by:

$$\varepsilon = \arctan\left(\frac{\Delta d_{ref}}{f}\right),$$

where $\Delta d_{ref}$ is the position of the spot formed by the reference beam on the second photoelectric position sensor with respect to the null position during every sampling period, and f is the focal length of the collimating lens.

11. The method according to 9, wherein the spatial angular deflections of the measurement and reference beams adjusted by the beam steering device is calculated using $\phi=\varepsilon$.

12. The method according to claim 9, wherein the angular deflection of the beam splitting target which deflects with the object being measured is calculated by:

$$\theta = \frac{1}{2}\arctan\left(\frac{\Delta d_m}{f}\right),$$

where $\Delta d_m$ is the position of the spot formed by the measurement beam on the first photoelectric position sensor with respect to the null position during every sampling period.

13. A photoelectric autocollimation apparatus comprising an autocollimator, a beam steering device, a data processing controller and a beam drift monitoring and separating unit based on a beam splitting target;

the autocollimator comprising:
a laser source,
a reticle,
a polarization-insensitive beamsplitter,
a collimating lens, and
a first photoelectric position sensor that is positioned on the focal plane of a collimating lens in the reflection direction of a polarization-insensitive beamsplitter, the output signal of the first photoelectric position sensor being transferred to the data processing controller that calculates the angular deflection of the measurement mirror according to this output signal;

wherein the beam steering device is positioned right in front of the collimating lens and comprises a beam steering actuator and a driving mechanism, the beam steering device being connected to the data processing controller so that the deflection of the beam steering device can be controlled;

wherein the beam drift monitoring and separating unit comprises:
a first polarizing beamsplitter,
a mirror,
a ½ wave plate,
a beam splitting target,
a second polarizing beamsplitter, and
a second photoelectric position sensor;

wherein the beam splitting target is a prism with half of its slope coated with semi-reflective coating film and the other half uncoated;

wherein the beam splitting target is positioned on the object being measured, and it deflects with the object being measured;

wherein the first polarizing beamsplitter is positioned between the beam steering device and the beam splitting target, and is close to the beam splitting target, with its transmission direction aiming at the coated half slope of the beam splitting target;

wherein the mirror is positioned at 45° with respect to the uncoated half slope of the beam splitting target and at 45° with respect to the reflection direction of the first polarizing beamsplitter;

wherein the ½ wave plate is positioned between the uncoated half slope of the beam splitting target and the mirror;

wherein the first polarizing beamsplitter, mirror, the ½ wave plate and the beam splitting target are fastened into an assembly that deflects with the object being measured;

wherein the second polarizing beamsplitter is positioned in the reflection direction of the polarization-insensitive beamsplitter, between the polarization-insensitive beamsplitter and the focal plane of the collimating lens;

wherein the second photoelectric position sensor is positioned on the focal plane of the collimating lens in the reflection direction of the second polarizing beam splitter; and wherein the output signal of the second photoelectric position sensor is transferred to the data processing controller that calculates the magnitude of beam drift according to the output signal; and wherein the laser beam emitted from the laser source is a linear polarized beam with the polarization plane coincident with the transmitted polarization plane of the first polarizing beam splitter.

14. The apparatus according to claim 13, wherein, the mirror of the beam drift monitoring and separating unit is a plane mirror, a total reflection prism, or a polarizing beamsplitter with the reflected polarization plane coincident with the first polarizing beamsplitter.

* * * * *